United States Patent [19]
Casady et al.

[11] Patent Number: 5,825,295
[45] Date of Patent: Oct. 20, 1998

[54] IRRIGATION SIGNALING DEVICE

[75] Inventors: William Walter Casady, Columbia; William Eugene Stevens, Portageville, both of Mo.

[73] Assignee: The Curators of the University of Missouri, Columbia, Mo.

[21] Appl. No.: 833,618

[22] Filed: Apr. 8, 1997

[51] Int. Cl.[6] .................................................. G08B 21/00
[52] U.S. Cl. ........................ 340/602; 137/78.3; 116/173; 73/73; 340/601; 340/604
[58] Field of Search ..................................... 340/602, 601, 340/604; 73/73; 137/78.3, 78.2; 239/71; 116/200, 173

[56] References Cited

U.S. PATENT DOCUMENTS

| | | | |
|---|---|---|---|
| 3,129,413 | 4/1964 | Watson | 340/602 |
| 3,803,570 | 4/1974 | Barlow et al. | 340/602 |
| 3,848,244 | 11/1974 | Young et al. | 340/665 |
| 3,961,753 | 6/1976 | Sears | 340/604 |
| 4,052,697 | 10/1977 | Daifotes | 340/472 |
| 4,316,575 | 2/1982 | VanDarwarka | 232/35 |
| 4,396,149 | 8/1983 | Hirsch | 239/63 |
| 4,548,225 | 10/1985 | Busalacchi | 137/78.3 |
| 4,567,563 | 1/1986 | Hirsch | 73/73 |
| 4,801,865 | 1/1989 | Miller et al. | 340/602 |
| 4,922,945 | 5/1990 | Browne | 137/78.3 |
| 5,408,221 | 4/1995 | Carsella, Sr. et al. | 340/604 |
| 5,596,944 | 1/1997 | Massie | 116/28 R |

*Primary Examiner*—Jeffery A. Hofsass
*Assistant Examiner*—Sihong Huang
*Attorney, Agent, or Firm*—Howell & Haferkamp, L.C.

[57] ABSTRACT

A device for signaling a predetermined soil moisture condition includes a switching tensiometer that closes a switch when the root water tension reaches a predetermined level; a power source connected to the switching tensiometer; and a signal connected to the switching tensiometer so that when the switching tensiometer closes the switch, power source is connected to the signal operate the signal to indicate that the predetermined soil moisture condition has been reached. The signal preferably includes a spring-loaded flag that operates between a retracted position and an extended signal position; a latch for releasably securing the flag in its retracted position, and an electrically operated release that releases the latch to allow the flag to operate to its extended signal position.

13 Claims, 3 Drawing Sheets

IRRIGATION SIGNALING DEVICE

FIELD OF THE INVENTION

This invention relates to an irrigation signaling device, and in particular to a device that signals when a switching tensiometer has reached its set point.

BACKGROUND OF THE INVENTION

Switching tensiometers, such as that disclosed in U.S. Pat. No. 3,559,062, are used to measure the root water tension and operate solenoids in irrigation systems to control the delivery of irrigation water. These devices, however, do not provide any visible signal when their predetermined set point is met, and therefore using such tensiometers to monitor soil moisture requires that each tensiometer be visually inspected. Traveling to the various tensiometers in a field for this visual inspection is tedious and time consuming, and is often sacrificed in favor of other tasks. Thus soil moisture is not optimally controlled.

SUMMARY OF THE INVENTION

The present invention relates to a signaling device which operates with a tensiometer to provide a signal of the soil moisture condition by signaling when the tensiometer's set point has been reached. The signal can be monitored remotely so the time and effort of the inspecting tensiometers can be significantly reduced. The signaling device provides a positive and stable proof that the set point has been reached. The signaling device is of simple, inexpensive, yet robust construction. It has minimal power requirements, so that it has a long and reliable service life.

Generally, the signaling device of the present invention comprises a switching tensiometer that closes a switch when the root water tension reaches a predetermined level. A power source is connected to the switching tensiometer; as is a signal so that when the switching tensiometer closes the switch, the power source is connected to the signal to indicate that the predetermined soil moisture condition has been reached. The signal preferably includes a spring-loaded flag that operates between a retracted position and an extended signal position; a latch for releasably securing the flag in its retracted position, and an electrically operated release that releases the latch to allow the flag to operate to its extended signal position. The release preferably includes an electric motor for operating the latch. A switch may be provided for disconnecting the power source from the electric motor when the flag is in its extended signal position in order to conserve power.

The device is of simple and inexpensive yet robust construction. The flag provides a positive signal above the crop canopy that can be remotely monitored, dramatically reducing the time required to monitor soil condition, and thereby improving the quality and frequency of the monitoring, allowing swifter intervention if irrigation is needed. The device has minimal power requirements, and thus operates reliably for extended periods. These and other features and advantages will be in part apparent, and in part pointed hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
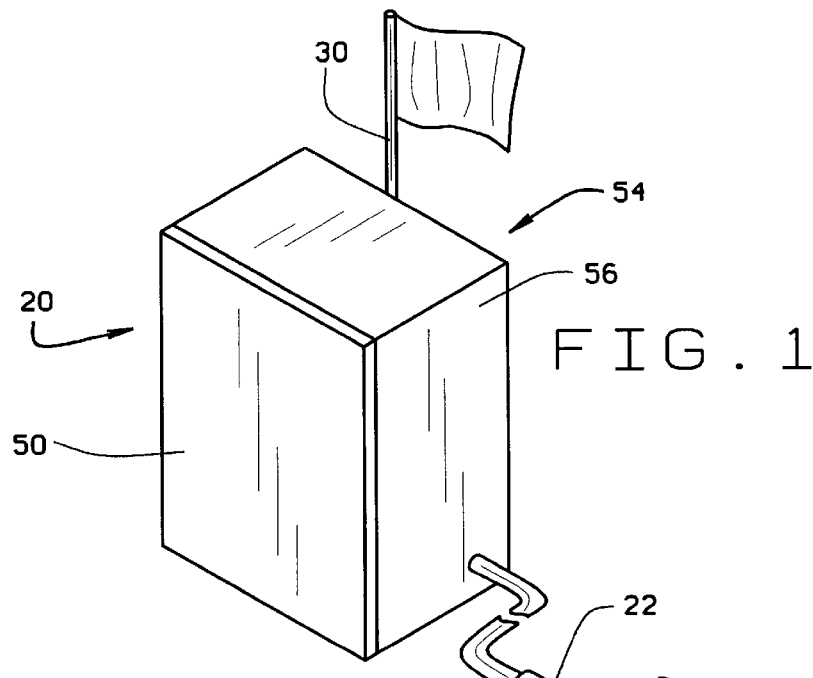
FIG. 1 is a perspective view of a first embodiment of a signaling device constructed according to the principles of this invention.
Figure 2:
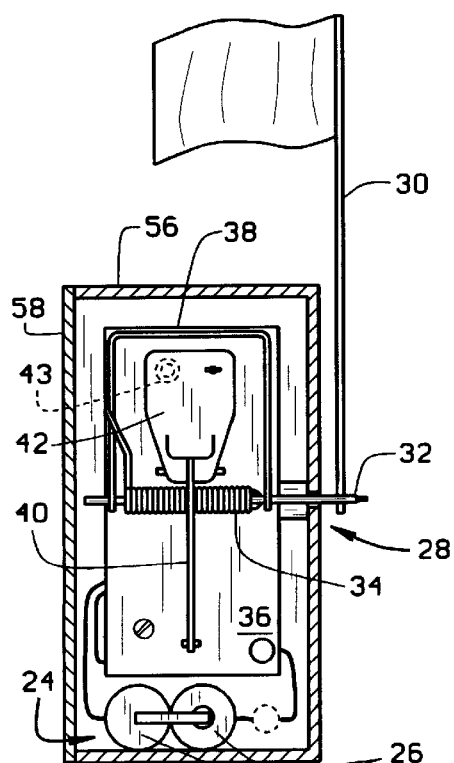
FIG. 2 is a vertical cross-sectional view of the signaling device of the first embodiment taken along the plane of line 2—2 in FIG. 1.
Figure 3:
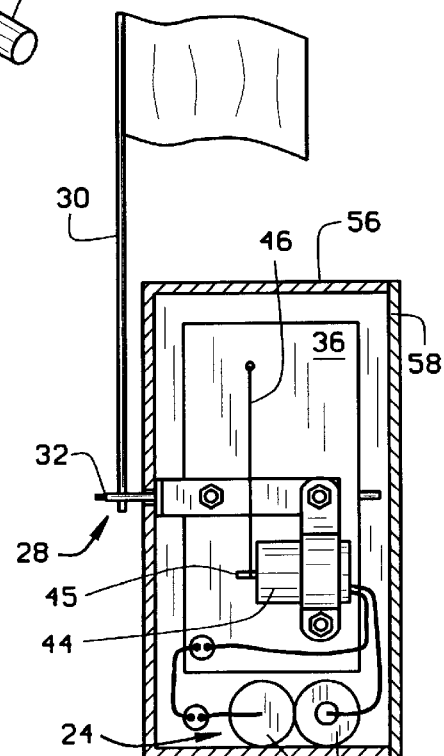
FIG. 3 is a vertical cross-sectional view of the signaling device of the first embodiment taken along the plane of line 3—3 in FIG. 1.
Figure 4:
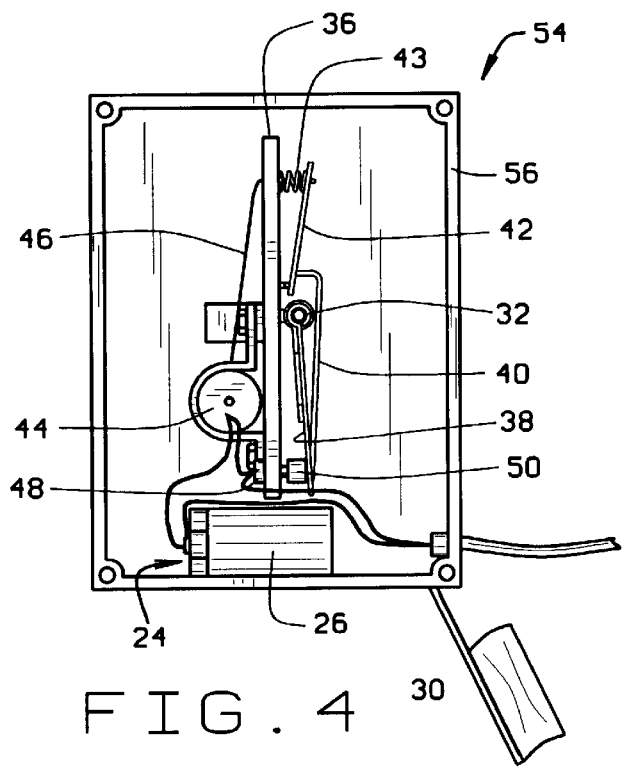
FIG. 4 is a front elevation view of the signaling device of the first embodiment, with the front cover removed, showing the signal flag in its retracted position.

A first embodiment of an irrigation signaling device constructed according to the principles of this invention is indicated generally as 20 in FIGS. 1–5. The signaling device 20 is adapted to indicate a predetermined soil moisture condition. The signaling device 20 comprises a switching tensiometer 22 of the type that closes a switch when the root water tension measured by the switching tensiometer reaches a predetermined level. The switching tensiometer 22 may be, for example a model R/SR tensiometer available from Irrometer Company, Riverside, Calif. The signalling device also includes a power supply 24. In this preferred embodiment the power supply is a pair of batteries 26 connected in series. The signaling device 20 also includes a signal 28. The power supply 24 and the signal 28 are connected to the switching tensiometer 22 so that when the root water tension measured by the tensiometer reaches a predetermined level, the switching tensiometer connects the power source 26 and the signal 28 operate the signal to indicate that predetermined soil moisture condition has occurred.

In this first preferred embodiment the signal 28 comprises a flag 30. The flag 30 is secured to a rotatable axle 32 so that the flag can operate between a retracted position (shown in FIG. 4) and an extended signal position (shown in FIGS. 1–3 and 5). The flag 30 is resiliently biased to its extended position by a coil spring 34 mounted on a vertically oriented panel 36. A wire loop 38 is connected to the axle 32 and the spring 34 such that the loop rotates with the axle 32 and the flag 30 secured to the axle. The loop 38 moves from a cocked position (FIG. 4) when the flag 30 is in its retracted position to a released position (FIG. 5) when the flag is in its extended signal position. A latch 40 is mounted on the panel 36 to releasably engage the loop 38 in its cocked position and thereby retain the flag 30 in its retracted position. A trigger 42, biased with a spring 43, releases the latch 40 when depressed. An electric motor 44 is mounted on the back of the panel 36 and is adapted to operate the trigger 42 to release the latch 40. A cord 46 extends from the armature of the motor 44 through an opening in the panel 36 to the trigger 42, so that when the motor turns, the cord winds around the armature and actuates the trigger. The electric motor 44 is connected to the switching tensiometer 22 so that when the switch on the switching tensiometer closes, the electric motor is connected to the power supply 24 causing the electric motor to wind the cord 46 and actuate the trigger 42, releasing the latch 40 so that flag 30 can move under the force of spring 34 to its extended signal position.

There is preferably a normally open switch 48 on the panel 36 that is electrically connected in electric circuit of signaling device. The switch 48 includes an actuator 50 which, when actuated, temporarily closes the switch. The switch 48 is positioned so that the loop 38 actuates the actuator 50 to close the switch when the loop is in its cocked position corresponding to the flag 30 being in its retracted position. The release of the flag 30 is accompanied by the movement of the loop 38, and when the loop moves, the actuator 50 of the switch 48 is released, allowing the switch to return to its normally open condition. This disconnects the motor 44 from the power supply 24 to protect the power supply.

The signaling device is preferably enclosed in a protective case 54 comprising a housing 56 with an access plate 58. The axle 32 extends through the back wall of the protective case 54 so that flag 30 remains outside the case so that it can be seen.

Figures 7, 8:
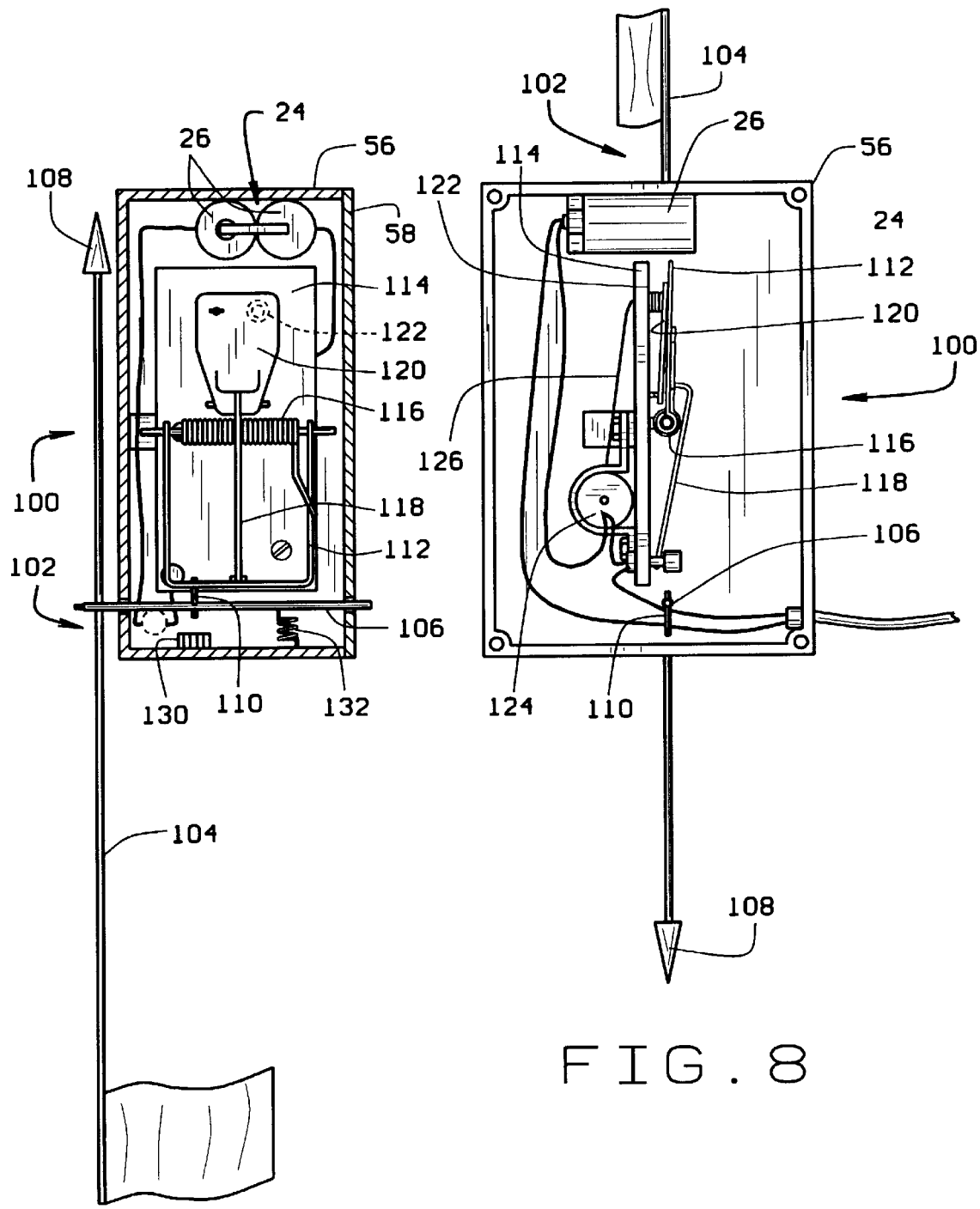
FIG. 7 is a vertical cross sectional view of a second embodiment of a signaling device constructed according to the principles of this invention.
FIG. 8 is a front elevation view of the signaling device of the second embodiment.

A second embodiment of a signaling device constructed according to the principles of this invention is indicated generally as 100 in FIGS. 7 and 8. The signaling device 100 is similar in construction to signaling device 20, and corresponding parts are identified with corresponding reference numerals. Like signaling device 20, signaling device 100 is adapted to indicate a predetermined soil moisture condition. The signaling device 100 comprises a switching tensiometer 22 of the type that closes a switch when the root water tension measured by the switching tensiometer reaches a predetermined level. The switching tensiometer 22 may be, for example a model R/SR tensiometer available from Irrometer Company, Riverside, Calif. The signaling device 100 also includes a power supply 24. In this preferred embodiment the power supply is a pair of batteries 26 connected in series. The signaling device 20 also includes a signal 102. The power supply 24 and the signal 102 are connected to the switching tensiometer 22 so that when the root water tension measured by the tensiometer reaches a predetermined level, the switching tensiometer connects the power source 26 and the signal 102 to operate the signal to indicate that the predetermined soil moisture condition has occurred.

In this second preferred embodiment the signal 102 comprises a flag 104. The flag 104 is secured to a rotatable axle 106 so that the flag can operate between a retracted position (shown in FIG. 7) and an extended signal position (shown in FIG. 8). The flag 104 is biased to its extended position by a counterweight 108 on the end of the flag 104. There is a pin 110 on the axle 106. A latch mechanism releasably engages the pin 110 to retain the signal flag 104 in its retracted position. This latch mechanism comprises a wire loop 112 pivotally mounted on a panel 114, and biased with a spring 116. The loop 112 moves from a cocked position (FIG. 7) when the flag 30 is in its retracted position to a released position (FIG. 8) when the flag is in its extended signal position. A latch 118 is mounted on the panel 114 to releasably engage the loop 112 in its cocked position. The loop 112 in turn engages the pin 110 on the axle 106 against the panel 114, thereby retaining the flag 104 in its retracted position. A trigger 120, biased with a spring 122, releases the latch 118 when depressed. An electric motor 124 is mounted on the back of the panel 114 and is adapted to operate the trigger 120 to release the latch 118. A cord 126 extends from the armature of the motor 124 through an opening in the panel 114 to the trigger 120, so that when the motor turns, the cord winds around the armature and actuates the trigger. The electric motor 124 is connected to the switching tensiometer 22 so that when the switch on the switching tensiometer closes, the electric motor 124 is connected to the power supply 24 causing the electric motor to wind the cord 126 and actuate the trigger 120, releasing the latch 118 so that loop snaps to its released position, releasing the pin 110, and allowing the flag 104 to swing to its extended signal position.

There is a latch 130 for engaging the pin 110 when the flag 104 reaches its extended signal position so that the flag does not continue to swing. A small spring 132 may be secured on the axle 106 to bias the axle to turn in the correct direction.

There is preferably a normally open switch 48 on the panel 114 that is electrically connected in electric circuit of signaling device. The switch 48 includes an actuator 50 which, when actuated, temporarily closes the switch. The switch 48 is positioned so that the loop 112 actuates the actuator 50 to close the switch when the loop is in its cocked position corresponding to the flag 104 being in its retracted position. The release of the flag 104 is accompanied by the movement of the loop 112, and when the loop moves, the actuator 50 of the switch 48 is released, allowing the switch to return to its normally open condition. This disconnects the motor 124 from the power supply 24 to protect the power supply.

The signaling device 100, like signaling device 20, is preferably enclosed in a protective case 54 comprising a housing 56 with an access plate 58. The axle 106 extends through the back wall of the protective case 54 so that flag 104 remains outside the case so that it can be seen.

OPERATION

Figure 6:
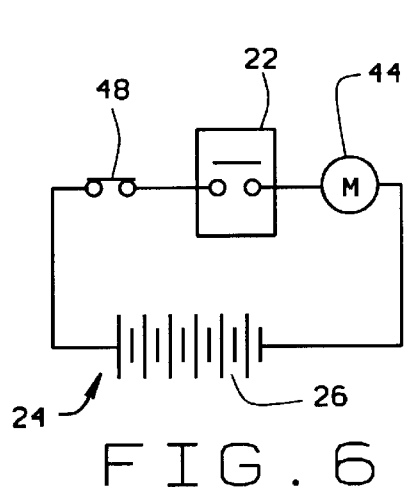
FIG. 6 is a schematic view of the signaling device of the first embodiment.
Figure 5:
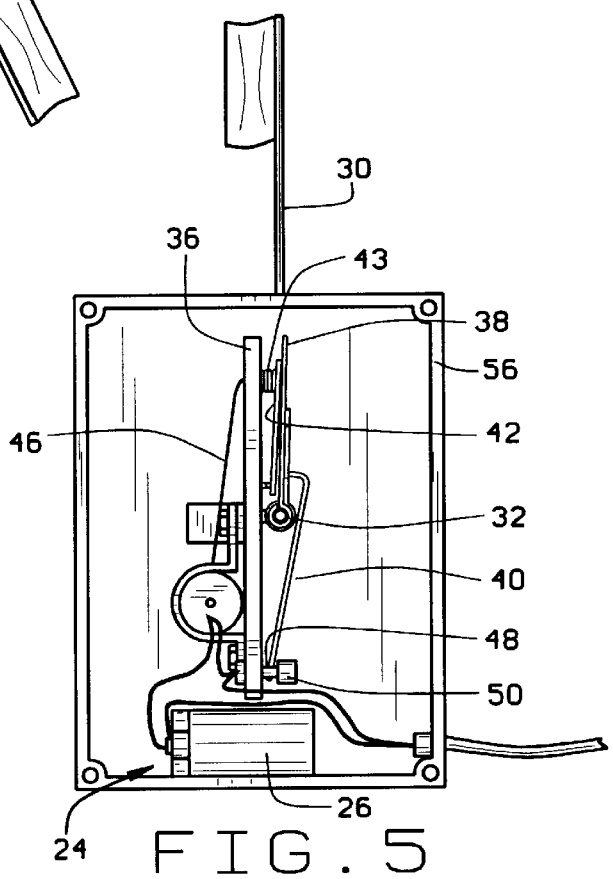
FIG. 5 is a front elevation view of the signaling device of the first embodiment, with the front cover removed, showing the signal flag in its extended position.

The signal device 20 is installed at a height so that the flag 30 is visible above the plant canopy when the flag is in its extended signal position. In operation, the signal device is set by moving the flag to its retracted position (shown in FIG. 4) and securing it in this position by engaging the loop 38 with the latch 40. In this position the loop 38 engages the actuator 50 on the switch 48, holding the switch in its closed position. The access plate 58 is placed on the housing 56 to protect the mechanism. When the switching tensiometer 22 measures a root water tension corresponding to a predetermined set point, the switching tensiometer closes its switch, which closes the electric circuit (which is shown in FIG. 6) in the signaling device 20. This electrically connects the power supply 24 and the electric motor 44. The armature 45 of the motor 44 turns, winding the cord 46, which pulls on the trigger 42 to release the latch 40. When the latch 40 is released, flag 30 swings under the force of the spring 34 to its extended signal position. The loop 38 which moves with the flag 30, releases the actuator 50 of the switch 48 opening the circuit between the power supply 24 and the motor 44.

The signal device is easily reset by removing the access plate 58, moving the loop 38 back to its cocked position and securing it with the latch 40. The access plate 58 is then replaced on the case 56, and the signal device 20 is again ready to indicate when the root water tension reaches the predetermined set point on the switching tensiometer 22.

The signal device 100 is installed at a height so that the flag 104 is visible above the plant canopy when the flag is in its extended signal position. In operation, the signal device is set by moving the flag to its retracted position (shown in FIG. 7 and securing it in this position by securing the pin 110 between the loop and the panel 114, and engaging the loop 112 with the latch 130. In this position the loop 112 engages the actuator 50 on the switch 48, holding the switch in its closed position. The access plate 58 is placed on the housing 56 to protect the mechanism. When the switching tensiometer 22 measures a root water tension corresponding to a predetermined set point, the switching tensiometer closes its switch, which closes the electric circuit (which is shown in FIG. 6) in the signaling device 100. This electrically connects the power supply 24 and the electric motor 124. The armature 128 of the motor 124 turns, winding the cord 126, which pulls on the trigger 120 to release the latch 118. When the latch 118 is released, the loop 112 snaps to its released position, freeing the pin 110, and allowing the flag 104 to swing under the force of the counterweight 108 to its extended signal position. The loop 112 also releases the actuator 50 of the switch 48 opening the circuit between the power supply 24 and the motor 124.

The signal device is easily reset by removing the access plate 58, moving the loop 112 back to its cocked position, securing the pin 110 against the panel 114, and securing the loop with the latch 118. The access plate 58 is then replaced on the case 56, and the signal device 100 is again ready to indicate when the root water tension reaches the predetermined set point on the switching tensiometer 22.

What is claimed is:

1. A device for signaling a predetermined soil moisture condition, the device comprising:

a switching tensiometer that closes a switch when the moisture content of the soil reaches a predetermined level;

a power source connected to the switching tensiometer; and a signal comprising a signal flag operable between a retracted position and an extended signal position, the flag being resiliently biased to its extended signal position, a latch for releasably securing the flag in its retracted position, and a release electrically connected to the switching tensiometer so that when the predetermined level is reached and the switching tensiometer closes the switch, the power source is connected to the release to release the latch and allow the signal flag to operate to its extended signal position.

2. The device according to claim 1 wherein the power source includes at least one battery.

3. The device according to claim 1 further comprising a disconnect switch that disconnects the power source and the release when the flag is in its extended signal position.

4. The device according to claim 1 wherein the release comprises an electric motor connected to the power source for releasing the latch.

5. The device according to claim 4 further comprising a disconnect switch that disconnects the power source and the electric motor when the flag is in its extended signal position.

6. A device for signaling a predetermined soil moisture condition, the device comprising:

a switching tensiometer that closes a switch when the moisture content of the soil reaches a predetermined level;

a power source, including at least one battery, connected to the switching tensiometer; and a signal comprising a signal flag operable between a retracted position and an extended signal position, and resiliently biased to its extended signal position; a latch for releasably securing the flag in its retracted position; and a release including an electric motor that releases the latch, the electric motor being electrically connected to the switching tensiometer so that when the predetermined level is reached and the switching tensiometer closes the switch, the power source is connected to the electric motor to cause it to release the latch and allow the signal flag to operate to its extended signal position.

7. The device according to claim 6 further comprising a disconnect switch that disconnects the power source and the motor release when the flag is in its extended signal position.

8. The device according to claim 7 wherein the disconnect switch comprises a normally open switch with an actuator that closes the normally open switch, and wherein the disconnect switch is positioned so that the flag operates the actuator to close the disconnect switch when the flag is in its retracted position.

9. A device for signaling a predetermined soil moisture condition, the device comprising:

a switching tensiometer that closes a switch when the moisture content of the soil reaches a predetermined level;

a power source, including at least one battery, connected to the switching tensiometer; and a signal comprising a signal flag operable between a retracted position and an extended signal position, and biased to its extended signal position; a latch for releasably securing the flag in its retracted position; and a release including an electric motor that releases the latch, the electric motor being electrically connected to the switching tensiometer so that when the predetermined level is reached and the switching tensiometer closes the switch, the power source is connected to the electric motor to cause it to release the latch and allow the signal flag to operate to its extended signal position.

10. The device according to claim 9 wherein the signal flag is pivotally mounted on an axle, and further comprising a pin on the axle, and wherein the latch releasably engages the pin to releasably secure the flag in its retracted position.

11. The device according to claim 9 wherein the signal flag is resiliently biased to its extended signal position with a counterweight.

12. The device according to claim 9 further comprising a disconnect switch that disconnects the power source and the motor release when the flag is in its extended signal position.

13. The device according to claim 12 wherein the disconnect switch comprises a normally open switch with an actuator that closes the normally open switch, and wherein the disconnect switch is positioned so that the flag operates the actuator to close the disconnect switch when the flag is in its retracted position.

* * * * *